United States Patent [19]

Hoff et al.

[11] Patent Number: 5,198,399
[45] Date of Patent: Mar. 30, 1993

[54] POLYMERIZATION CATALYST AND METHOD

[75] Inventors: Raymond E. Hoff, West Chester, Ohio; Leonard V. Cribbs, Houston, Tex.

[73] Assignee: Quantum Chemical Corporation, New York, N.Y.

[21] Appl. No.: 822,440

[22] Filed: Jan. 17, 1992

[51] Int. Cl.$^5$ .................................................. C08F 4/02

[52] U.S. Cl. ...................... 502/111; 502/104; 502/115; 502/117; 502/125; 502/126; 526/142; 526/904

[58] Field of Search ............ 526/142, 904; 502/104, 502/111, 115, 117, 125, 126, 133, 134

[56] References Cited

U.S. PATENT DOCUMENTS

| | | | |
|---|---|---|---|
| 2,981,725 | 4/1961 | Luft et al. | 260/93.7 |
| 3,121,658 | 2/1964 | Orsino et al. | 162/146 |
| 3,297,466 | 1/1967 | Herman et al. | 117/47 |
| 3,503,785 | 3/1970 | Kruse | 117/62.2 |
| 3,654,249 | 4/1972 | Diedrich et al. | 260/88.2 |
| 3,759,884 | 9/1973 | Tokuzumi et al. | 260/88.2 |
| 3,876,602 | 4/1975 | Calvert et al. | 260/94.9 P |
| 3,926,717 | 12/1975 | Marchessault et al. | 162/157 C |
| 4,012,342 | 3/1977 | Dougherty | 525/426 |
| 4,021,599 | 5/1977 | Kochhar et al. | 526/124 |
| 4,039,472 | 8/1977 | Hoff | 252/429 C |
| 4,082,692 | 4/1978 | Goldie | 252/429 B |
| 4,097,409 | 6/1978 | Speakman | 252/429 R |
| 4,329,255 | 5/1982 | Beach et al. | 252/429 B |
| 4,359,403 | 11/1982 | Hoff et al. | 252/429 B |
| 4,374,753 | 2/1983 | Pullukat et al. | 252/429 B |
| 4,431,788 | 2/1984 | Kaminsky | 526/142 |
| 4,530,913 | 7/1985 | Pullukat et al. | 502/104 |
| 4,532,311 | 7/1985 | Fulks et al. | 526/62 |
| 4,792,592 | 12/1988 | Fulks et al. | 526/62 |
| 4,792,640 | 12/1988 | Mehta | 568/851 |
| 4,803,251 | 2/1989 | Goode et al. | 526/59 |
| 5,045,612 | 9/1991 | Schell, Jr. et al. | 526/142 |
| 5,051,484 | 9/1991 | Sasaki et al. | 526/904 |

FOREIGN PATENT DOCUMENTS

834217  5/1960  United Kingdom .

OTHER PUBLICATIONS

W. Kaminsky, "Polymerization and Copolymerization with a Highly Active, Soluble Ziegler-Natta Catalyst", *Transition Metal Catalyzed Polymerization, Alkenes and Dienes, Part A*, R. P. Quirk, et al., eds., Harwood Academic Publishers, pp. 225-244 (1981).

H. D. Chanzy, "Transition-Metal Catalysts for Polyethylene Encapsulation of Substrates", Ph.D. Thesis, Syracuse University (1966).

A. Dankovics et al., "Kinetic Studies on the Cellulose-Propylene System in Presence of Ziegler-Natta Catalysts", *J. Appl. Poly. Sci.*, vol. 13, pp. 1809-1824 (1969).

T. Heinze, et al., "Sphärische ionotrope Gele carboxygruppenhaltiger Cellulose-derivate als Trägermaterialien für biologische Wirkstoffe, I" *Agnew, Macromolecular Chem.*, 169, p. 69 (1989) (including an English language summary).

*Primary Examiner*—Joseph L. Schofer
*Assistant Examiner*—David Wu
*Attorney, Agent, or Firm*—Marshall, O'Toole, Gerstein, Murray & Bicknell

[57] ABSTRACT

A catalyst, a method of preparing the catalyst, and a method of using the catalyst with a suitable cocatlayst in the polymerization or copolymerization of 1-olefins are disclosed. The catalyst is prepared by: a) contacting a group IIA organometallic compound, like 2-methylpentanoxymagnesium chloride, or a Group III organometallic compound, like triethylaluminum, or a combination thereof, with a porous or nonporous biodegradable substrate having active surface hydroxyl groups, like cellulose, to provide a modified biodegradable substrate; then b) contacting the modified biodegradable substrate with a transition metal compound, such as a transition metal halide or alkoxide, like titanium tetrachloride or vanadium(V)trichloride oxide, to form discrete catalyst particles. The catalyst particles are used in conjunction with a suitable cocatlalyst, like triethylaluminum, in the homopolymerization or copolymerization of 1-olefins. During polymerization, porous biodegradable catalyst particles are fragmented into small solid particles that are trapped within polymer. The fragmented catalyst particles are allowed to remain within the polymer; do not adversely affect the physical or esthetic properties of the polymer or articles made therefrom; and serve as biodegradable sites that facilitate environmental degradation of the polymer.

39 Claims, 1 Drawing Sheet

POLYMERIZATION CATALYST AND METHOD

FIELD OF THE INVENTION

This invention relates to an olefin polymerization catalyst, a method of making the catalyst, and a method of polymerizing one or more 1-olefins utilizing the catalyst with a cocatalyst. More particularly, the invention relates to a Ziegler-type catalyst useful in polymerizing one or more 1-olefins, wherein the catalyst is prepared by first contacting a Group IIA or Group III organometallic compound with a biodegradable substrate having surface hydroxyl groups (e.g., cellulose) to provide a modified biodegradable substrate. The modified biodegradable substrate then is contacted with a hydrocarbon solution of a transition metal, such as titanium, vanadium, or zirconium, to provide a catalyst. Optionally, a portion of the hydroxyl groups of the biodegradable substrate can be modified by silylation or fluoridation prior to the modification of the remaining hydroxyl groups of the biodegradable substrate with the Group IIA or Group III organometallic compound. The inventive catalyst is a solid compound, and is used in conjunction with a cocatalyst to effectively catalyze polymerization of 1-olefins. Catalyst particles trapped in the polymer product can remain in the polymer and do not adversely affect the physical or esthetic properties of the polymer or articles made therefrom. In addition, the trapped catalyst particles within the polymer serve as biodegradable sites that facilitate environmental degradation of the polymer.

BACKGROUND OF THE INVENTION

Ziegler discovered a two component catalyst for the polymerization of olefins. The catalyst included a compound of the group IVB-VIB metals of the periodic table and an organometallic compound belonging to Groups I-IIIA of the periodic table. The traditional Ziegler catalysts efficiently promoted the polymerization and copolymerization of olefins to provide high yields of polyolefins that possess the properties desired for practical applications. However, although Ziegler catalysts have been widely utilized, conventional Ziegler catalysts demonstrate important disadvantages. Researchers have discovered numerous Ziegler-type catalysts that demonstrated improvements over the traditional Ziegler catalysts. The improved Ziegler-type catalysts have been employed for many years in the production of polyolefins. However, these new catalysts had relatively low activity and stability. Thus, because disadvantages in Ziegler-type catalysts still exist, improvements in Ziegler-type catalysts for polymerizing one or more 1-olefins are continually being sought.

Researchers especially have attempted to provide catalysts demonstrating a higher activity and a high stereospecificity. In particular, so-called "supported catalysts", such as titanium supported on a suitable carrier, have been developed. For example, U.S. Pat. No. 2,981,725 discloses a process wherein the catalyst components were deposited on an inert support such as magnesium chloride, silicon carbide, silica gel, calcium chloride or a similar compound. However, the activity of the resulting catalyst is still low. In addition, several catalysts have been disclosed wherein a titanium halide or a vanadium halide is reacted with a magnesium-containing support, such as a magnesium alkoxide or magnesium hydroxy chloride. U.S. Pat. Nos. 3,654,249; 3,759,884; 4,039,472; 4,082,692; and 4,097,409 describe such catalysts. These supported catalysts greatly increased the ability of the titanium to polymerize a 1-olefin compared to a traditional Ziegler catalyst.

Research has been directed to making improved supported catalysts. Numerous patents disclose catalysts supported on silica or alumina. Porous silica and alumina supports for high-reactivity catalysts were found to fracture during polymerization reactions. The residual, fractured particles of catalyst in the polyolefins were sufficiently small such that the particles did not adversely affect the polyolefins. In contrast, nonporous silica and alumina catalyst supports do not fracture during polymerization reactions. Therefore, the residual nonporous catalyst particles embedded in the polyolefin resins were sufficiently large to cause bubble tearing in blown film line operations; defects and gels in thin films; and clogged filters in extruders.

Other support materials for Ziegler-type catalysts have been sought. For example, U.S. Pat. Nos. 3,297,466 and 3,503,785 disclose that solid particles, such as cellulose, carbon black, wool, silk, asbestos, glass fibers, metals, oxides and synthetic fibers, can be encapsulated by polymerizing an olefin on a solid particle surface having a polymerization catalyst incorporated therein. U.S. Pat. No. 3,121,658 discloses treating cellulose fibers with a two-component Ziegler catalyst to catalyze the polymerization of ethylene or propylene on the fiber, and therefore encapsulate the cellulose fiber. Marchessault et al., in U.S. Pat. No. 3,926,717, disclose forming a Ziegler-type catalyst throughout a formed cellulosic substrate. An olefin then is polymerized throughout the cellulosic substrate to improve the water resistance and heat-sealing properties of the substrate.

Other patents and publications also disclosed forming a Ziegler-type catalyst on a cellulosic substrate. For example, Kaminsky, in "Polymerization and Copolymerization with a Highly Active, Soluble Ziegler-Natta Catalyst", *Transition Metal Catalyzed Polymerization, Alkenes and Dienes, Part A*, R. P. Quirk, et al., eds., Harwood Academic Publishers, pp. 225-244 (1981), discloses coating a surface of a cellulosic substrate with a polymer by attaching a catalyst to the surface of the substrate, then polymerizing ethylene on the substrate surface. Other patents and publications that disclose the use of a cellulosic substrate for a Ziegler-type catalyst include:

H. D. Chanzy, "Transition Metal Catalysts for Polyethylene Encapsulation of Substrates", Ph.D. Thesis, Syracuse University (1966);

A. Dankovics et al., *J. Appl. Poly. Sci.*, Vol. 13, pp. 1809-1824 (1969), wherein a Ziegler-Natta catalyst is adsorbed onto a cellulose surface, and a subsequent polymerization of propylene on the surface encapsulates the cellulose, the encapsulated cellulose and untreated cellulose then are combined to form a pulp to make paper;

Dougherty, U.S. Pat. No. 4,012,342, discloses the low pressure polymerization of olefins on the surface of organic fibers including a catalyst to provide a high molecular weight polymer;

Kochhar et al., U.S. Pat. No. 4,021,599; Beach et al., U.S. Pat. No. 4,329,255; UK Pat. No. 834,217; Calvert et al., U.S. Pat. No. 3,876,602; Fulks et al., U.S. Pat. Nos. 4,532,311 and 4,792,592; and Goode et al., U.S. Pat. No. 4,803,251. None of these patents or publications disclose the catalyst and methods of the invention. Although these later investigations extended the original work of Ziegler to produce several improved catalysts, no catalyst has exhibited the improved properties demonstrated by a catalyst of the invention.

In general, some of the above-identified patents and publications disclose a traditional Ziegler catalyst made from two components. These original Ziegler catalysts were characterized by a low reactivity compared to later Ziegler-type catalysts. The improved Ziegler-type catalysts were higher activity catalysts formed on the surface of a solid inorganic support from an organometallic compound and a transition metal compound. The resulting Ziegler-type catalyst then was used in a polymerization reaction with a cocatalyst, like an alkylaluminum compound. Isotacticity promoters and reactivity promoters also can be included in the polymerization reaction.

Ziegler catalysts that utilized a solid organic support, such as cellulose, were traditional Ziegler catalysts that merely provided a sufficient amount of polymer to coat or encapsulate the organic support. In contrast to merely encapsulating the organic support, a catalyst of the present invention is an improved Ziegler-type catalyst and provides extensive polymerization at the internal and external surfaces of the organic support. The polymerization is sufficiently extensive that the organic support particles are fragmented by the growing polymer. This particle fragmentation provides an intimate molecular level blending of the organic support material with the polyolefin.

The prior art has addressed some of the features demonstrated by a catalyst of the invention. However, the prior art catalysts for polymerizing 1-olefins still possessed disadvantages. For example, in the polymerization of 1-olefins, the presence of residual catalyst in the polymer product can cause corrosion in molding machines and can introduce esthetic flaws into the molded polymer product. Accordingly, the catalyst residue was stripped from the polymer product before molding. Therefore, it would be advantageous to provide a catalyst for polymerizing 1-olefins that can remain in the polymer product and not adversely affect the molding apparatus or the esthetic properties of the molded product. Such a catalyst would eliminate a costly and time-consuming step in the processing of polymerized 1-olefins.

Furthermore, researchers have attempted to discover a polymer that possesses the desirable physical and chemical properties of a polymerized 1-olefin, and that also is biodegradable. Attempts at incorporating the feature of biodegradability into a poly-1-olefin either have failed or have adversely affected the physical properties of the polymer. Therefore, it also would be advantageous to utilize a polymerization catalyst that incorporates a degree of biodegradability into a poly-1-olefin. It would be especially advantageous if the catalyst could impart the feature of biodegradability, or pseudobiodegradability, into the poly-1-olefin product because the need for biodegradable additives, or for comonomers, to promote biodegradability of the polymer would be eliminated. Consequently, the full benefits of the desirable physical and chemical properties of a poly-1-olefin could be realized. No known catalyst useful for homopolymerizing or copolymerizing 1-olefins meets this need for imparting biodegradability into the polymer.

For example, physically blending starch and polyethylene provides a mixture exhibiting a degree of biodegradability. However, in accordance with the invention, the biodegradable component is included in the catalyst, and in accordance with another important feature of the invention, the biodegradable component is more uniformly and intimately dispersed throughout the poly-1-olefin, and the amount of the biodegradable component included in the poly-1-olefin is reduced while maintaining the same degree of biodegradability.

SUMMARY OF THE INVENTION

The invention is directed to a supported catalyst, a method of preparing the catalyst, and a method of using the catalyst, in conjunction with an organoaluminum cocatalyst, in the homopolymerization or copolymerization of 1-olefins. More particularly, the invention is directed to an improved Ziegler-type catalyst. The improved catalyst is a supported catalyst produced by: a) contacting an organometallic compound selected from the group consisting of a Group IIA organometallic compound, a Group III organometallic compound, a Group IIA-Group III organometallic complex and combinations thereof with a biodegradable substrate having surface hydroxyl groups to provide a modified biodegradable substrate, then b) contacting the modified biodegradable substrate with a hydrocarbon solution of a transition metal compound, like a transition metal halide or a transition metal alkoxide, to form an inventive catalyst. The improved catalysts are stable particulate solids. The catalysts also are highly active, and can be used in particle form and in gas phase polymerization processes. Polymers synthesized using the improved catalysts demonstrate a high melt index and a narrow molecular weight distribution, thereby making the polymers well-suited for injection molding and rotational molding manufacturing applications.

The solid support material of the present catalyst is a biodegradable substrate having surface hydroxyl groups, such as a carbohydrate (e.g., cellulose or starch). Optionally, a portion of the surface hydroxyl groups of the biodegradable substrate can be modified by silylation or fluoridation prior to the modification of the remaining hydroxyl groups of the biodegradable substrate with the Group IIA or Group III organometallic compound. A polymer synthesized in the presence of a present catalyst does not require a post-polymerization process step to remove catalyst residues from the polymer because the catalyst residues do not adversely affect the physical or chemical properties of the polymer or articles made therefrom. Furthermore, the polymer, or articles made therefrom, demonstrate biodegradable, or pseudobiodegradable, properties because the catalyst residues present in the polymer include the biodegradable substrate that facilitates environmental degradation of the polymer product. Present-day Ziegler-type supported catalysts utilize inorganic nonbiodegradable supports, such as silica or alumina, and do not demonstrate enhanced polymer product degradation.

Previously-used Ziegler and Ziegler-type catalysts supported on organic substrates such as cellulose did not provide a high yield of polymer relative to the substrate. The previous cellulose-supported catalysts were two component Ziegler-type catalysts that only promoted sufficient polymerization to coat or encapsulate the cellulose support. The coated cellulose support demonstrated enhanced water resistance and strength because of the polymer coating, but the polymer produced by these cellulose-supported substrates was unsuitable for injection molding or rotational molding applications.

In contrast, a catalyst of the invention includes a biodegradable substrate; is highly active; and is suitable for use in the polymerization of a 1-olefin (e.g., ethylene or propylene) and the copolymerization of 1-olefins (e.g., ethylene with one or more 1-olefins having about 3 to about 20 carbon atoms, or mixtures thereof), to form polymers of either low, medium or high density. The inventive catalysts are especially useful in the production of polypropylene and in the production of high and low density polyethylene having a narrow molecular weight distribution and a high melt index. Furthermore, the melt index of a polymer produced by a catalyst of the invention can be controlled by methods known in the art, such as increasing the temperature of polymerization or by the addition of hydrogen.

The improved catalysts of the invention are free-flowing solid particles; demonstrate a high activity; and produce polymers having a good particle nature. A polymer produced in a method using a catalyst described herein demonstrates a narrow molecular weight distribution and a low elasticity. In addition, a catalyst of the invention is suitable for polymerizing ethylene and other 1-olefins, particularly 1-olefins including from 2 to about 8 carbon atoms, such as propylene, butene and hexene, for example; and is suitable for copolymerizing a 1-olefin having from 2 to about 8 carbon atoms with 1-olefins including from 2 to about 20 carbon atoms to form copolymers of low and medium densities.

A catalyst of the invention, in addition to efficiently catalyzing the polymerization or copolymerization of a 1-olefin, also provides the previously mentioned biodegradability features. It should be understood that a catalyst of the present invention is entrapped in the poly-1-olefin, and that the poly-1-olefin itself does not actually biodegrade. However, the organic biodegradable support of the catalyst does biodegrade, thereby weakening the structural integrity of the poly-1-olefin, and promoting environmental degradation of the poly-1-olefin. Accordingly, a catalyst of the invention imparts a pseudobiodegradability feature into the poly-1-olefin product.

DETAILED DESCRIPTION OF THE PREFERRED EMBODIMENTS

A catalyst of the invention demonstrates a higher reactivity in 1-olefin polymerizations compared to a prior, two-component Ziegler catalyst. Accordingly, the invention provides an improved catalyst useful in the polymerization of 1-olefins; a method of making the improved catalyst; and a method of producing a poly-1-olefin using the present catalyst in conjunction with a cocatalyst. In general, and as will be described more fully hereinafter, the catalyst is prepared by first contacting a Group IIA organometallic compound, a Group III organometallic compound or a Group IIA-Group III organometallic complex with a biodegradable substrate having surface hydroxyl groups to provide a modified biodegradable substrate. The modified biodegradable substrate then is contacted with a hydrocarbon solution of a transition metal compound, like a transition metal halide or a transition metal alkoxide, to provide discrete particles of a catalyst the present invention. Optionally, a portion of the surface hydroxyl groups of the biodegradable substrate can be modified by silylation or fluoridation before modification of the remaining hydroxyl groups of the biodegradable substrate by interaction with the Group IIA or Group III organometallic compound.

In particular, and in accordance with an important aspect of the invention, the supported substrate of the inventive catalyst is a biodegradable substrate having hydroxyl groups. The prior art has disclosed improved Ziegler-type catalysts including an inorganic substrate, like silica or alumina, first reacted with a Group IIA or Group III organometallic compound, then reacted with a transition metal halide or transition metal alkoxide to yield the catalyst. Similarly, the prior art disclosed a traditional, two component Ziegler catalyst adsorbed on a cellulose substrate in order to coat or encapsulate the cellulose substrate with a polyolefin. However, no known prior art taught or suggested using a biodegradable organic substrate as the support for an improved Ziegler-type catalyst. The inventive catalyst is more reactive than previous cellulose-supported catalysts and imparts a degree of biodegradability, or pseudobiodegradability, into a polymer manufactured from the catalyst.

Suitable biodegradable substrates include naturally-occurring organic materials that include hydroxyl groups and that are subject to degradation by normal environmental influences, such as by bacteria, moisture or sunlight. In order to serve as a suitable support for the catalytic components of the catalyst, the biodegradable substrate is a solid compound. A particularly advantageous class of biodegradable substrates is the carbohydrates. Carbohydrates have the advantages of abundant supply, favorable economics and including a sufficient number of sufficiently active hydroxyl groups. Suitable carbohydrates include those selected from monosaccharides, disaccharides, oligosaccharides, polysaccharides and combinations thereof. Particular carbohydrates that are suitable biodegradable substrates for a catalyst of the present invention include, but are not limited to, sucrose, glucose, fructose, xylose, ribose, mannose, maltose, lactose, gentiobiose, starch, cellulose, glycogen, dextran, mannan, chitin, pectin, hemicellulose, carrageenan, alginic acid, plant gums and combinations and salts thereof. Other suitable biodegradable substrates include, for example, lignin and collagen.

In addition, various derivatives of the carbohydrates can be used as the biodegradable substrate of the present catalyst. For example, in addition to cellulose, useful cellulose derivatives include, but are not limited to, ethylcellulose, hydroxypropylcellulose, carboxymethylcellulose, methylcellulose, hydroxybutylcellulose, carboxymethylhydroxyethylcellulose, methylhydroxypropylcellulose, ethylhydroxyethylcellulose, methylhydroxyethylcellulose, methylethylcellulose and combinations thereof. Chitosan, a derivative of chitin, also is a suitable biodegradable substrate. Numerous other carbohydrates, such as those listed on pages 28 through 34 of the 1990 catalog of Sigma Chemical Co., St. Louis, Mo., are well known and can be used as the biodegradable substrate as long as the carbohydrate is a solid compound and includes a sufficient number of sufficiently active hydroxyl groups to interact with a Group IIA organometallic compound or a Group III organometallic compound.

Therefore, the identity of the biodegradable substrate is not necessarily limited, provided that the substrate is a solid and includes a sufficient number of sufficiently active hydroxyl groups. Preferred biodegradable substrates include cellulose, carboxymethylcellulose, starch, fructose, sucrose, glucose, chitin, chitosan, alginic acid salts, ethylcellulose, hydroxypropylcellulose, hydroxybutylcellulose, and combinations thereof.

The carbohydrates and carbohydrate derivatives are useful in their commercially-available forms, provided that the carbohydrate or carbohydrate derivative is sufficiently dry, such as less than about 1% water by weight. In a preferred embodiment, the carbohydrate or carbohydrate derivative is treated to preserve, or create, the porosity of the particle. The surface area of the carbohydrate or carbohydrate derivative, measured by BET porosimetry methods, should be at least about 50 $m^2/g$ (square meters per gram), and the pore volume should be at least about 0.50 mL/g (milliliters per gram). In one such treatment, the carbohydrate or carbohydrate derivative is subjected to a series of solvent extractions to replace water with a liquid of lower surface tension, followed by evaporation of the low surface tension liquid. Such a treatment has effectively maintained the high surface area of a bacterial cellulose manufactured by Weyerhaeuser Company, Tacoma, Wash., and sold under the trade name CELLULON.

The biodegradable substrate can be regularly or irregularly shaped, however a regularly shaped biodegradable substrate is preferred. To achieve the full advantage of the invention, the biodegradable substrate is spherical in shape. A suitable biodegradable substrate has a relatively small particle size, such as from about $5\mu$ (microns) to about $100\mu$ in diameter. Preferably, the biodegradable substrate has a particle size of from about $5\mu$ to about $60\mu$ in diameter; and to achieve the full advantage of the invention has a particle size in the range of from about $5\mu$ to about $25\mu$ if the substrate is nonporous, and about $25\mu$ to about $50\mu$ if the substrate is porous. Accordingly, among the nonporous biodegradable substrates, a preferred biodegradable substrate is microcrystalline cellulose. Among the porous biodegradable substrates, a preferred biodegradable substrate is a bacterial cellulose, like CELLULON, in a pressed and ground form.

It also should be understood, and will be demonstrated more fully hereinafter, that the biodegradable substrate can be partially or completely solubilized during the manufacture of a present catalyst. The solubilization of the biodegradable substrate does not adversely affect the activity of the catalyst and allows the manufacture of a catalyst having a particular desired shape. For example, solid cellulose can be dissolved in the manufacture of the catalyst, then regenerated from solution to provide a biodegradable substrate of a particular shape; or carboxymethylcellulose can be precipitated from solution as an insoluble metal salt, as disclosed by T. Heinze et al., *Angew. Macromolecular Chem.*, 169, pp. 69-82 (1989), to provide a spherical biodegradable substrate.

In addition, it is preferred that the particle of the biodegradable substrate be relatively porous. It has been proposed that a porous biodegradable substrate allows the hydroxyl groups in the interior surfaces of biodegradable substrate to contact the Group IIA or Group III organometallic compound, and subsequently the transition metal compound, to provide catalytically-active sites on the interior surfaces of the biodegradable substrate particle, as well as on the exterior surface of the biodegradable substrate particle. Consequently, when a catalyst of the invention is used in conjunction with an organoaluminum cocatalyst in the polymerization of one or more 1-olefins, the polymer is formed both on the exterior and interior surfaces of the catalyst. The polymer forming on the interior surfaces of the catalyst causes the biodegradable substrate support particle to fragment. This reduction in size of the biodegradable substrate particle permits the growing polymer and the biodegradable substrate to blend intimately at a molecular level. Therefore, the biodegradation of polymer product is enhanced by the uniform and intimate distribution of the biodegradable substrate throughout the polymer.

In addition to the above-described benefits of a biodegradable substrate, several biodegradable substrates, like carbohydrates, have a well-defined stereochemistry. Accordingly, the chirality of the hydroxyl groups of the biodegradable substrate can be used to introduce chirality into the catalyst. The chirality of the catalyst, in turn provides isotactic polyolefin products. Furthermore, it is expected that the molecular weight distribution of a polyolefin produced from a catalyst having a biodegradable support will be different from the molecular weight distribution of a polyolefin produced from a catalyst having an inorganic support. Therefore, it is expected that the molecular weight distribution of a HDPE manufactured from a catalyst of the present invention will be much more narrow than the molecular weight distribution of a HDPE manufactured from a prior art catalyst.

Optionally, a portion of the hydroxyl groups of the biodegradable substrate can be modified by silylation or fluoridation prior to contacting and modifying the remaining hydroxyl groups of the biodegradable substrate with a Group IIA or a Group III organometallic compound. Modification by silylation or fluoridation has been performed on inorganic support materials, like silica or alumina. The silylation modification or the fluoridation modification does not alter the ability of a catalyst of the invention to promote polymerization, and does not alter the properties of a polyolefin produced from the catalyst. The silylation and fluoridation modifications cap a portion of the available hydroxyl groups and alter the geometry of available catalytic sites on the catalyst.

For example, a carbohydrate substrate can be treated with a monofunctional organic silicon-containing compound to reduce the number of active hydroxyl groups on the surfaces of the biodegradable carbohydrate substrate. By reducing the number of surface hydroxyl groups, it is possible to control the reactivity and chemical geometry of the catalyst. However, if the biodegradable substrate undergoes an optional silylation or fluoridation treatment, a sufficient number of active hydroxyl groups must remain on the surface of the biodegradable substrate as sites for incorporating the active catalyst components.

Examples of a suitable organic silicon-containing compound for silylation include, but are not limited to, hexamethyldisilazane, trialkylsilyl ethoxides and trialkylchlorosilanes. Pullukat et al., in U.S. Pat. No. 4,530,913, fully disclose the treatment of hydroxyl groups on a silica support with hexamethylsilazane. Pullukat et al., in U.S. Pat. No. 4,374,753, fully disclose the treatment of hydroxyl groups with other silicon-containing compounds. Similarly, the biodegradable substrate, if desired, can be treated with a fluorine compound prior to interaction and modification with a Group IIA or Group III organometallic compound. Treatment of an inorganic substrate, like silica or alumina, with a fluorine compound to reduce the number of available hydroxyl groups is fully described in Hoff et al. U.S. Pat. No. 4,359,403.

In the preparation of a catalyst of the invention, a biodegradable substrate, either unmodified or modified by silylation or fluoridation, first is contacted with a Group IIA or Group III organometallic compound. Preferably, the metal of the Group IIA organometallic compound is magnesium or calcium, and metal of the Group III organometallic compound is aluminum. The organometallic compound interacts with a hydroxyl group of the biodegradable substrate to position a Group IIA metal or a Group III metal on the biodegradable support. In general, the biodegradable substrate first is dried, then is allowed to contact a hydrocarbon solution of the Group IIA or Group III organometallic compound at a temperature of about 0° C. to about 100° C. for about 10 minutes to about 180 minutes. After contact at a sufficient temperature for a sufficient time, the hydrocarbon solvent is evaporated. After filtering, a solid biodegradable substrate modified with an organometallic compound results. The modified biodegradable substrate then is contacted with a transition metal compound to provide a catalyst of the present invention.

The Group IIA or Group III organometallic compound used to contact and modify the biodegradable substrate is soluble in a hydrocarbon. Examples of such Group IIA and Group III organometallic compounds include, but are not limited to, alkoxymagnesium halides, dialkoxymagnesium compounds, dialkylmagnesium compounds, trialkylaluminum compounds, dialkylaluminum halides and alkylaluminum halides. The alkyl group or alkoxy group of the Group IIA organometallic compound includes from about three to about twenty carbon atoms in order to impart sufficient hydrocarbon solubility to the organometallic compound. The alkyl or alkoxy group of the Group IIA or Group III organometallic compound includes from about two to about four carbon atoms. A halide present in the Group IIA or Group III organometallic compound is chloride or bromide. Complexes of Group IIA and Group III organometallic compounds, such as magnesium and aluminum organometallic complexes, like $(R_2Mg)_n AlR^1_3$, wherein R and $R^1$ are alkyl or alkoxy groups as defined above and n is a number in the range of 1 to about 8, also can be used.

Particular Group IIA or Group III organometallic compounds that can be used in the preparation of a catalyst of the present invention include, but are not limited to, 2-methylpentoxymagnesium chloride, pentoxymagnesium chloride, phenoxymagnesium chloride, di.ethylhexyloxymagnesium, di-2-methylpentoxymagnesium, dibutylmagnesium, dihexyl magnesium, n-butylethylmagnesium, dibutylmagnesium-triethylaluminum complex, triethylaluminum and combinations thereof. Numerous other suitable hydrocarboxymagnesium halides, i.e., alkoxymagnesium halides, are disclosed in Mehta, U.S. Pat. No. 4,792,640. In addition, an alkylmagnesium silylamide, depicted by the general structural formula $R^2-Mg-N(Si(CH_3)_3)_2$, wherein $R^2$ is an alkyl group including from one carbon atom to about 18 carbon atoms, can be used as the Group IIA organometallic compound.

The amount of Group IIA organometallic compound or Group III organometallic compound used to modify the biodegradable substrate of the present catalyst is related to the amount of transition metal compound included in the catalyst. Generally, the ratio, by weight, of Group IIA or Group III organometallic compound, or combination thereof, to transition metal is in the range from about 0.1 to about 100. Preferably, the weight ratio of organometallic compound to transition metal is in the range of from 0.1 to about 20.

It is not necessary to contact the entire amount of the Group IIA or Group III organometallic compound with the active hydroxyl groups of the biodegradable substrate. In the case of a nonporous biodegradable substrate, like microcrystalline cellulose, the hydroxyl groups within the substrate particles are not accessible for contact. The excess, or uncontacted Group IIA of Group III organometallic compound, can remain in solution when the transition metal compound is added. Then, upon evaporation of the liquid from the catalyst preparation solution the particles of the biodegradable substrate are coated with the excess catalyst-forming reagents.

After solvent evaporation, the resulting modified biodegradable substrate is free-flowing, if the modification is conducted using the correct ratio of ingredients. The ratio of the Group IIA or Group III organometallic compound to the nonporous biodegradable substrate, and the ratio of the transition metal compound to the nonporous biodegradable substrate, are determined in relation to the particle size of the biodegradable substrate. A high-reactivity catalyst is readily achieved even though it has been hypothesized that a catalyst prepared with a nonporous biodegradable substrate does not fragment during polymerization reactions. Consequently, when a nonporous biodegradable substrate is used, it is preferred to utilize a biodegradable substrate having a particle size of about 5 to about 25 microns. In a polyethylene sample polymerized from a vanadium catalyst supported on nonporous microcrystalline cellulose, unaltered particles of the microcrystalline cellulose support were observed embedded in the polyethylene in an examination with an optical microscope. To avoid the disadvantages of visible polyolefin film defects, filter clogging in extrusion, and bubble breaking in blown film manufacture, the nonporous biodegradable substrate particles utilized in the catalyst preparation therefore must be sufficiently small.

The excess Group IIA or Group III organometallic compound also can be removed, if desired, from the modified biodegradable substrate by solvent washing before the addition of other catalyst-forming reagents. Furthermore, all excess reagents and by-products can be removed by solvent washing prior to the final drying of the catalyst.

After contacting a porous biodegradable substrate, like CELLULON, or a nonporous biodegradable substrate, like microcrystalline cellulose, with the Group IIA or Group III organometallic compound, the biodegradable substrate, optionally, can be further modified by capping the hydroxyl groups of the biodegradable substrate with magnesium alkoxide or aryloxide groups (—MgOR), alkyl or aryl magnesium groups (—MgR) or dialkyl aluminum groups (—AlR$_2$). Similarly, the hydroxyl groups can be capped with calcium organometallic groups. If desired, an appropriate percentage of the hydroxyl groups can be capped with trialkylsilyl (—SiR$_3$) groups through silylation or capped with fluoride through fluoridation. The biodegradable substrate modified with a Group IIA or Group III organometallic moiety then is made catalytically active by contacting the modified biodegradable substrate with a transition metal compound.

In general, the biodegradable substrate modified with a Group IIA or Group III organometallic moiety is contacted with a hydrocarbon solution of a transition metal compound, such as a heptane solution of titanium tetrachloride. Optionally, an isotacticity promoter, like 1-naphthol, titanium cresylate or an alkoxysilane, can be included in the hydrocarbon solution of the transition metal compound. In general, the isotacticity promoter can be added to the modified biodegradable substrate either before, after, or in combination with the transition metal compound.

The resulting mixture, comprising the modified biodegradable substrate, the transition metal compound, the hydrocarbon and, optionally, the isotacticity promoter, is heated to a temperature of from about 80° C. to about 120° C., then maintained within this temperature range for a time period of about 5 minutes to about 120 minutes. The hydrocarbon solvent then is removed, and a dry catalyst of the present invention is provided.

The transition metal compound contacted with the modified biodegradable substrate is a halide, oxyhalide, alkoxyhalide or alkoxide, or mixture thereof, of a transition metal selected from the group consisting of titanium, vanadium, zirconium, chromium, nickel, cobalt, niobium, tantalum, palladium, rhodium, molybdenum, tungsten, and combinations thereof. Preferably, the transition metal of the transition metal compound is selected from the Group IVB metals, the Group VB metals, and combinations thereof. To achieve the full advantage of the present invention, the transition metal of the transition metal compound is titanium, vanadium, zirconium, or a combination thereof.

In particular, suitable transition metal compounds include, for example, but are not limited to, TiX$_4$, Ti(OR$^3$)$_x$X$_{4-x}$, VOX$_3$, VX$_4$, Zr(OR$^3$)$_x$X$_{x-4}$, or mixtures thereof, wherein X is chloride or bromide and R$^3$ is cyclopentadienyl, an alkyl, a cycloalkyl or an alkenyl group including from one to about ten carbon atoms; or an aryl or alkaryl group including about five to about 20 carbon atoms. The R$^3$ groups of the transition metal compound can be the same or different, and x is zero or an integer from 1 to 4 inclusive. Examples of suitable transition metal compounds include, but are not limited to, titanium tetrachloride, titanium(IV) methoxide, methoxytitanium trichloride, diethoxytitanium dichloride, titanium tetrabromide, vanadium(V)trichloride oxide, vanadium(IV) chloride, bis(cyclopentadienyl)zirconium dichloride and zirconium n-propoxide. The amount of transition metal compound included in the hydrocarbon solution to contact the modified biodegradable substrate is sufficient to provide about 0.05% to about 50%, and preferably about 0.5% to about 20%, of a transition metal, based on the weight of the modified biodegradable substrate.

It should be appreciated that both steps in the preparation of a catalyst of the invention, i.e., the modification of a biodegradable substrate with a Group IIA or Group III organometallic compound and the subsequent contact of the modified biodegradable substrate with a transition metal compound, can involve contact between a solid support and a liquid solution. Consequently, no ballmilling or other solid mixing is required. Accordingly, an expensive and difficult operation, that is common in the preparation of polymerization catalysts of the prior art, is eliminated. As known to those skilled in the art, the hydrocarbon solvent can remain with the mixture or can be removed from the mixture by decantation, filtration or evaporation.

Furthermore, the modified biodegradable support can be solubilized, either partially or wholly, in the hydrocarbon solution of the transition metal compound. It has been found that solubilization of the modified biodegradable support does not adversely affect the activity of the catalyst, and that an added advantage is realized in that a solid catalyst having a particular desired geometrical shape, such as spherical or cylindrical, can be regenerated from the solubilized biodegradable support. The particular geometric shape of the catalyst then can provide a polymer product having a desired shape.

Another important aspect of the present invention involves using a catalyst of the present invention in the polymerization of 1-olefins to produce a 1-olefin homopolymer or a 1-olefin copolymer. In this process, either a 1-olefin, like ethylene or propylene, or a combination of 1-olefins is polymerized under suitable polymerization conditions in the presence of a catalyst of the present invention.

In the polymerization of 1-olefins, a cocatalyst also is present in addition to a catalyst of the present invention. The cocatalyst generally is an aluminum compound. The aluminum compound is preferably an alkylaluminum compound, like a trialkylaluminum compound an alkylaluminum hydride, an alkylaluminum halide, or a mixture thereof. Preferably, the cocatalyst is a trialkylaluminum compound. An alkyl group of a suitable cocatalyst is a hydrocarbon chain, either straight chained or branched, including from one to about ten carbon atoms. Triarylaluminum compounds also can be used as a cocatalyst. Examples of suitable cocatalysts include, but are not limited to, triethylaluminum, trioctylaluminum, tri(2-methylpentyl)aluminum, diethylaluminum hydride, methylaluminoxane, triisobutylaluminum and diisobutylaluminum hydride. Triisobutylaluminum (TIBAL) and diisobutylaluminum hydride are especially preferred. Alkyl aluminum halides, like diethylaluminum chloride or ethylaluminum dichloride, can be used with the alkylaluminum compounds described above. Other suitable cocatalysts include diethylaluminum ethoxide and diethylaluminum trimethylsiloxide.

Often, a second cocatalyst is included in the polymerization zone. The second cocatalyst usually is a hydrocarbyl alkoxysilane having the general structural formula R$^4_x$Si(OR$^5$)$_{4-x}$, wherein R$^4$ is a hydrocarbyl, i.e., alkyl, group including from one to about six carbon atoms; R$^5$ is an alkyl group including from one to about ten carbon atoms; and x is a numeral from 1 to 4. Examples of such second cocatalysts include, but are not limited to, hexyltrimethoxysilane, pentyltriethoxysilane and isobutyltrimethoxysilane (IBTMS). In addition to the cocatalyst, compounds that increase isotacticity, like alkoxysilanes, and halocarbon promoters, also can be included in the polymerization reaction zone. Halocarbon promoters are especially useful if vanadium is the transition metal present in the catalyst.

The cocatalyst is introduced into the polymerization reaction zone in conjunction with, or separately from, a catalyst of the invention. The proportion of cocatalyst to solid catalyst included in the polymerization reaction zone can be varied. The proportion of cocatalyst to solid catalyst is related to the concentration of the transition metal in the solid catalyst. The mole ratio of the aluminum metal in the cocatalyst to the transition metal in the solid catalyst is about 3:1 to about 100:1, and preferably is about 3:1 to about 10:1.

A catalyst of the invention, in conjunction with a cocatalyst, is used in the homopolymerization or copolymerization of a 1-olefin having the general structural formula $R^6CH=CH_2$, wherein $R^6$ is hydrogen or a straight chain or branched chain alkyl group having from one to about 10, and preferably from one to about 8, carbon atoms. Examples of such 1 olefins include, but are not limited to, ethylene, propylene, butene-1, hexene-1, 4-methyl-1-pentene, 1-octene and combinations thereof.

The homopolymerization or copolynerization can be performed in suspension, solution or in the gaseous phase, continuously or in a batch process, at a temperature of from about 20° C. to about 300° C., and preferably from about 60° C. to about 100° C., under a pressure ranging from atmospheric pressure to about 10,000 psi. The polymerization preferably is performed at a pressure of about 300 psi to about 800 psi.

The melt index of the poly-1-olefin produced by a catalyst of the invention can be controlled by methods known in the art, such as by increasing the polymerization temperature or by adding hydrogen. The present catalysts exhibit a relatively high activity in ethylene polymerizations and copolymerizations. The polymers produced from the present catalyst are easily blended with antioxidants, and can be pelletized for commercial use.

To further demonstrate a catalyst and the methods of the invention, the following nonlimiting examples illustrate catalysts of the invention, the preparation of the catalysts and the use of the catalysts in a polymerization reactions.

EXAMPLE 1

Preparation of Catalyst A

A catalyst of the invention was prepared in a 500 mL (milliliter) glass flask having a porous glass frit fused across the lower portion of the flask. Below the glass disc frit, tubing led to a three-way stopcock. The flask, the glass adaptors, the parts of a stirrer bearing, the glass shaft, the teflon paddle stirrer and all other flask accessories were dried in an oven at about 120° C. for about 18 hours before use. The flask and accessories were assembled while hot, and connected to a source of low pressure nitrogen. The catalyst was prepared under a nitrogen blanket to essentially eliminate contact between the interactants and ambient air.

In the preparation of catalyst A, cellulose was used as the biodegradable substrate. Therefore, after assembling the flask, ten grams of microcrystalline cellulose, AVICEL Type PH101, available from FMC Corp., Philadelphia, Pa., was placed on the glass frit in the dry flask. This grade of microcrystalline cellulose has a small surface area of about 2.9 m²/g (square meters per gram) and essentially no pore volume, as determined by BET nitrogen porosimetry. The microcrystalline cellulose was stirred and purged with an upward flow of dry nitrogen for about one hour. Then, heptane (40 mL (milliliter)) was added to the flask to form a microcrystalline cellulose slurry. Finally, 55 mL of a 0.90 molar solution of 2-methylpentanoxymagnesium chloride in heptane was added to the flask. The 2-methylpentanoxymagnesium chloride solution is available from Lithco Co., Gastonia, N.C., and includes, in addition to the organometallic magnesium compound, a variable amount of 2-methylpentanol.

The resulting mixture was stirred for about thirty minutes at room temperature. The heptane and 2-methylpentanol then were evaporated to provide the microcrystalline cellulose modified with methylpentanoxymagnesium as a paste-like solid. The evaporation of heptane and 2-methylpentanol was performed under a flowing nitrogen blanket by placing the flask in an oil bath having a temperature of about 100° C.

After the paste-like solid formed, the flask was removed from the oil bath. The flask was cooled to room temperature, then 10 mL of heptane and 5.7 mL (50 millimole) of neat silicon tetrachloride were added to the flask rapidly and with constant stirring. The resulting mixture gelled. Heptane (60 mL) then was added to the flask, and the mixture was stirred for about thirty minutes. After sufficient stirring, the liquid phase was filtered from the mixture by applying about 5 psi (pounds per square inch) nitrogen pressure to the top of the mixture and forcing the liquid phase through the glass frit. After filtering for 3 days, the residue remaining in the flask was a friable white solid comprising the modified microcrystalline cellulose substrate.

Next, heptane (60 mL) was added to the flask, and the solid particles of the organometallic-modified microcrystalline cellulose were reduced in size by stirring with the teflon paddle. The heptane then was removed by filtering through the glass frit by applying about 4 psi nitrogen pressure above the frit and by connecting the lower portion of the flask below the frit to a vacuum pump.

Then, at room temperature, 30 mL of heptane and 10 mL of a 0.44 M (molar) solution of 1-naphthol in toluene were added to the modified microcrystalline cellulose in the flask, followed by the addition of 9.8 mL of neat titanium tetrachloride. The 1-naphthol was included in the mixture as an isotacticity promoter. The color of the resulting mixture was dark brown to black. The reaction flask then was placed in the oil bath having a temperature of about 90° C. for about 10 minutes. After cooling the reaction mixture, the reaction mixture was extracted three times with 100 mL of heptane, then once with 200 mL of heptane. After extraction, the interaction product in the flask was a solid having a blue color. Any liquid remaining in the flask was removed by a nitrogen flow at about 60° C. The interaction product was a free-flowing solid. The soft lumps of solid were reduced in size by the paddle stirrer to provide a catalyst of the present invention. Elemental analysis of catalyst A by standard analytical methods showed that the catalyst included 3.13 wt % titanium and 5.43 wt % magnesium.

To demonstrate the efficacy of Catalyst A, including magnesium and titanium on a biodegradable cellulose substrate, the catalyst prepared in this example was used in the polymerization of propylene, as illustrated below in Examples 2 through 5.

EXAMPLE 2

Polymerization of Propylene Utilizing Catalyst A

Propylene was polymerized utilizing Catalyst A of Example 1, and triethylaluminum and isobutyltrimethoxysilane as the cocatalysts. The polymerization was conducted at a temperature of about 158° F. (70° C.) and a pressure of 470 psi in a one liter pressure vessel. In particular, Catalyst A (0.0691 g (gram)) was added to the pressure vessel under a nitrogen blanket. The pressure vessel was sealed, then hydrogen (8.35 mmol (millimoles)) was added by pressure drop from a cylinder of known volume. Propylene liquid (500 mL) was forced from a reservoir into the pressure vessel by a nitrogen pressure of 470 psi. At 158° F. (70° C.) and 470 psi, a solution of triethylaluminum (TEAL) and isobutyltrimethoxysilane (IBTMS) was injected into the pressure vessel. The calculated ratio of the aluminum metal (Al) in TEAL to the IBTMS to titanium metal (Ti) was 80 Al/8 IBTMS/Ti. The polymerization reaction was conducted for one hour, and 104.8 g of granular polypropylene was prepared. The granular polypropylene particles were essentially globular in shape, without lumps, and exhibited a bulk density of 18.4 pounds/cubic foot. The weight % of the polypropylene that was insoluble in heptane (% HI) was 93.2 as determined by a standard procedure known to those skilled in the art. The reactivity of Catalyst A was 1416 g/g cat-hr., wherein the reactivity of the catalyst is expressed in grams of polypropylene formed per gram of catalyst in one hour. The melt flow rate of the polypropylene was determined by a standard ASTM method known to those skilled in the art was 3.65.

EXAMPLE 3

Polypropylene was polymerized according to the procedure outlined in Example 2, except 0.0870 g of Catalyst A was used, methylaluminoxane (MAO) was used as the cocatalyst in place of TEAL, and the IBTMS was omitted. The calculated ratio of aluminum metal in MAO to titanium was 100 to 1. A summary of analytical tests performed on the polypropylene formed in Example 3 is found below in Table I.

EXAMPLE 4

Propylene was polymerized according to the procedure outlined in Example 3, except the IBTMS was included. The calculated ratio of aluminum metal in MAO to IBTMS to titanium metal was 80 Al/8 IBTMS/Ti. A summary of analytical tests performed on the polypropylene formed in Example 4 is found below in Table I.

EXAMPLE 5

Propylene was polymerized according to the procedure outlined in Example 4, except the calculated ratio of aluminum metal from MAO to IBTMS to titanium metal was 80 Al/16 IBTMS/Ti. A summary of analytical tests performed on the polypropylene formed in Example 5 is found below in Table I.

lulose-supported catalyst of the present invention and an aluminum-based cocatalyst is of relatively high isotacticity and acceptable bulk density. TABLE I also shows that when MAO is used as the cocatalyst, the percent heptane insolubles (% HI), i.e., isotacticity, is decreased significantly, but catalyst reactivity is increased. Polymers demonstrating such a low heptane insolubility are useful in reinforcing brittle polymers.

EXAMPLE 6

Preparation of Catalyst B

Catalyst B was prepared by a method similar to the method used to prepare Catalyst A. However, in the preparation of Catalyst B, the amount of microcrystalline cellulose added to the reaction flask was decreased to 4.9 qrams. After the microcrystalline cellulose was introduced into the reaction flask, the microcrystalline cellulose was stirred and purged with dry nitrogen for about two hours at room temperature. Then, 27.2 mL of a 0.90 molar solution 2-methylpentanoxymagnesium chloride in heptane was added to the reaction flask. Accordingly, the flask included 5.12 millimoles of 2-methylpentanoxymagnesium chloride per gram of cellulose. After stirring the resulting mixture for about 50 minutes, the reaction flask was immersed in an oil bath having a temperature of about 100° C. Heating the mixture under a nitrogen flow for 25 minutes evaporated the heptane and 2-methylpentanol, and a paste-like mixture of heptane and the microcrystalline cellulose modified with the organometallic compound resulted.

After cooling the reaction flask to room temperature, 20 mL of heptane and 2.79 mL of neat silicon tetrachloride were added to the reaction flask. The resulting mixture was stirred for about one hour, then the mixture was filtered through the glass frit. The filtrate initially was a clear liquid, but became gel-like mass upon exposure to ambient air. Heptane (50 mL) then was added to the gel-like mass, and the resulting mixture was stirred for about one minute, then filtered again. After filtering, 1.46 mL of titanium cresylate, 9.8 mL of neat titanium tetrachloride and 30 mL of heptane were added to the mixture in the flask. The flask was placed in an oil bath at 90° C., and the reaction mixture was heated for about one hour. The reaction mixture then was maintained under a nitrogen blanket at room temperature for about 18 hours. During this time period, the ingredients of the reaction mixture interacted to form a viscous, dark-colored liquid having no visible solid particles. It was theorized that the organometallic modified microcrystalline cellulose dissolved in the titanium tetrachloride/heptane mixture. Discrete solid particles of Catalyst B were regenerated after washing the dark-colored liquid with heptane. The heptane washing included a first extraction with 50 mL of heptane, then, after filtration, five

TABLE I

| | | Summary of the Polymerization of Propylene Utilizing Catalyst A | | | | |
|---|---|---|---|---|---|---|
| Example | Al/IBTMS/Ti | g Polymer/g cat-hr.[1] | g Polymer/g Ti-hr.[2] | % HI[3] | Bulk Density | Melt Flow Rate |
| 2 | 80/8/1 | 1,416 | — | 93.2 | 18.4 | 3.65 |
| 3 | 100/00/1 | 5,300 | 170,400 | 54.3 | — | — |
| 4 | 80/8/1 | 3,500 | 112,800 | 64.3 | — | — |
| 5 | 80/16/1 | 364 | 11,600 | 74.4 | — | — |

[1]Amount of polymer formed (in grams) in one hour per gram of catalyst;
[2]Amount of polymer formed (in grams) in one hour per gram of titanium;
[3]Percent heptane insolubles, wherein the higher the percentage, the greater the isotacticity of the polypropylene.

The data summarized in TABLE I show that polypropylene produced in Examples 2, 3 and 4 with a celmore extractions with 150 mL of heptane. The final heptane filtrate was colorless. The solid residue remaining on the glass frit in the reaction flask was dried with a nitrogen flow. The solid residue was reduced in size by the paddle stirrer to provide freeflowing, salmon-colored granules of Catalyst B.

Elemental analysis of Catalyst B showed that the catalyst included 4.90 wt % magnesium and 3.23 wt % titanium. Catalyst B had a small surface area of 15.9 square meters/gram and a very low pore volume of 0.03 mL/g, as determined by BET nitrogen porosimetry.

EXAMPLE 7

Polymerization of Polypropylene Utilizing Catalyst B

Catalyst B was utilized in the polymerization of propylene in an procedure identical to the polymerization of propylene with Catalyst A in Example 2. The ratio of aluminum metal to IBTMS to titanium metal was 80 Al/8 IBTMS/Ti. The reactivity of Catalyst B was 3300 g/g cat/hr., and the % HI of the polypropylene was 95.2. Accordingly, the polymerization reaction of Example 7 illustrates that a catalyst of the present invention, including a biodegradable substrate, can be prepared from a cellulose support that dissolved in the titanium tetrachloride/heptane mixture. Therefore, it is envisioned that by extruding the solution including the organometallic-modified cellulose and the titanium tetrachloride into an aliphatic hydrocarbon liquid, the shape and size of a catalyst of the present invention can be varied as desired, such as into a sphere shape or a rod shape.

EXAMPLE 8

Preparation of Catalyst C

Catalyst C was prepared using STIR-N-SPERSE, a starch product available commercially from A. E. Staley Company, Decatur, Ill. as the biodegradable substrate. BET nitrogen adsorption porosimetry demonstrated that this starch product had a very low surface area of 0.05 m²/g and essentially no pore volume, and therefore, is a nonporous biodegradable substrate. The starch product (10.92 g) was introduced into a dry round bottom flask equipped with a teflon paddle stirrer and adapters for nitrogen purging and reagent addition. The starch product was stirred and purged with dry nitrogen for 3.5 hours, then heptane (50 mL) was added to the flask. The starch product and heptane were stirred into a slurry, then 8.2 mL of a 1.5 M ethylaluminum sesquichloride solution in heptane and 7.1 mL of a 0.665 M butylethylmagnesium solution in heptane were introduced into the flask, sequentially, by syringe. The resulting mixture was stirred at ambient temperature for about 15 minutes, then 3.6 mL of vanadium tri-n-propoxide solution (1.0 M in heptane) and 6.0 mL of titanium tetrachloride solution (1.0 M in heptane) were added to the flask. The resulting mixture became brown in color. When the color was uniform, the reaction flask was placed in an oil bath previously heated to about 90° C. The heptane then was removed by evaporation in a stream of dry nitrogen. Elemental analysis of Catalyst C by standard analytical methods showed that the resulting catalyst included the following weight percentages of elements: Al 2.17, Mg 0.65, V 1.09, and Ti 2.85.

EXAMPLE 9

Polymerization of Ethylene Utilizing Catalyst C

Catalyst C was utilized in a slurry polymerization reaction in isobutane at 93.3° C. Catalyst C (0.072 g) was transferred to a stainless steel pressure vessel equipped with a steam jacket, automatic temperature control device and a three-blade marine propeller mixer. Then, TIBAL (0.72 mM (millimoles) was added as a 25 wt. % solution in heptane. The pressure vessel was sealed, then 52 mM of hydrogen and 500 mL of isobutane were introduced into the pressure vessel. Ethylene then was introduced into the pressure vessel to bring the total vessel pressure up to about 550 psig. A polymerization reaction was allowed to continue for one hour at 93.3° C. The reactivity of Catalyst C was 1778 g of polyethylene/g of starch-supported catalyst. The high load melt index of the polyethylene was 0.386 g/10 minutes, as determined by a standard ASTM method.

EXAMPLE 10

Preparation of Catalyst D

Catalyst D was prepared using MALTODEXTRIN MICROPOR BUDS, a starch material available commercially from the A. E. Staley Company, Decatur, Ill. as the biodegradable substrate. This starch product was found to have essentially no pore volume by BET porosity measurements, and, therefore, also is a nonporous biodegradable substrate. Catalyst D was prepared by a procedure similar to the preparation of Catalyst C. The starch powder (7.64 g) was added to a dry flask and purged with nitrogen at room temperature for several days. Heptane (38.2 mL) was added to the flask, and the mixture was maintained as a slurry by stirring while additional reagents were added to the flask. A 4.8 mL volume of 1.6 M triethylaluminum solution in heptane and a 5.7 mL volume of 0.665 M butylethylmagnesium solution in heptane were syringed into the flask sequentially. Stirring of the resulting slurry was continued under nitrogen for one hour at room temperature. Then, a mixed solution of vanadium oxytrichloride (0.38 M) and titanium tetrachloride in heptane (0.62 M) was added to the flask. The heptane then was evaporated as in Example 8. By elemental analysis, the dark grey catalyst included 2.32 wt. % Al, 1.23 wt. % Mg, 0.73 wt. % V, and 1.29 wt. % Ti.

EXAMPLE 11

Polymerization of Ethylene Utilizing Catalyst D

Catalyst D was utilized in the polymerization of ethylene as described in Example 9, except that the amount of hydrogen was 104 millimoles, and, in some of the polymerizations, chloroform also was added to the polymerization reaction. When added, the amount of chloroform was equimolar to the trialkylaluminum cocatalyst, and in a molar ratio of 10/1 with respect to the sum of vanadium and titanium in the catalyst. Table 2 illustrates the results of the polymerization tests.

TABLE 2

| Reactivity (g/g cat.-hr) | Chloroform | Melt Index (MI) | HLMI/MI |
|---|---|---|---|
| 1029 | no | 0.14 | 43 |
| 2073 | no | 0.13 | 49 |
| 1030 | no | 0.07 | 46 |
| 1389 | no | 0.12 | 50 |
| 1238 | no | 0.12 | 40 |
| 1232 | yes | 0.07 | 58 |
| 763 | yes | 0.24 | 39 |
| 769 | yes | 0.20 | 49 |

The results illustrated in Table 2 show that the catalyst D, including a nonporous biodegradable carbohydrate substrate, has a reactivity sufficiently high for industrial use, without the need to remove catalyst residues. The yield of polyethylene in grams per gram of (V+Ti) per hour ranged from 38,000 to 102,600. Generally, when the amount of transition metal in polyethylene is less than 10 ppm by weight, no deleterious effects are observed in the polyethylene product. The polymerization time also can be increased to further reduce the transition metal residues.

Figure 1:
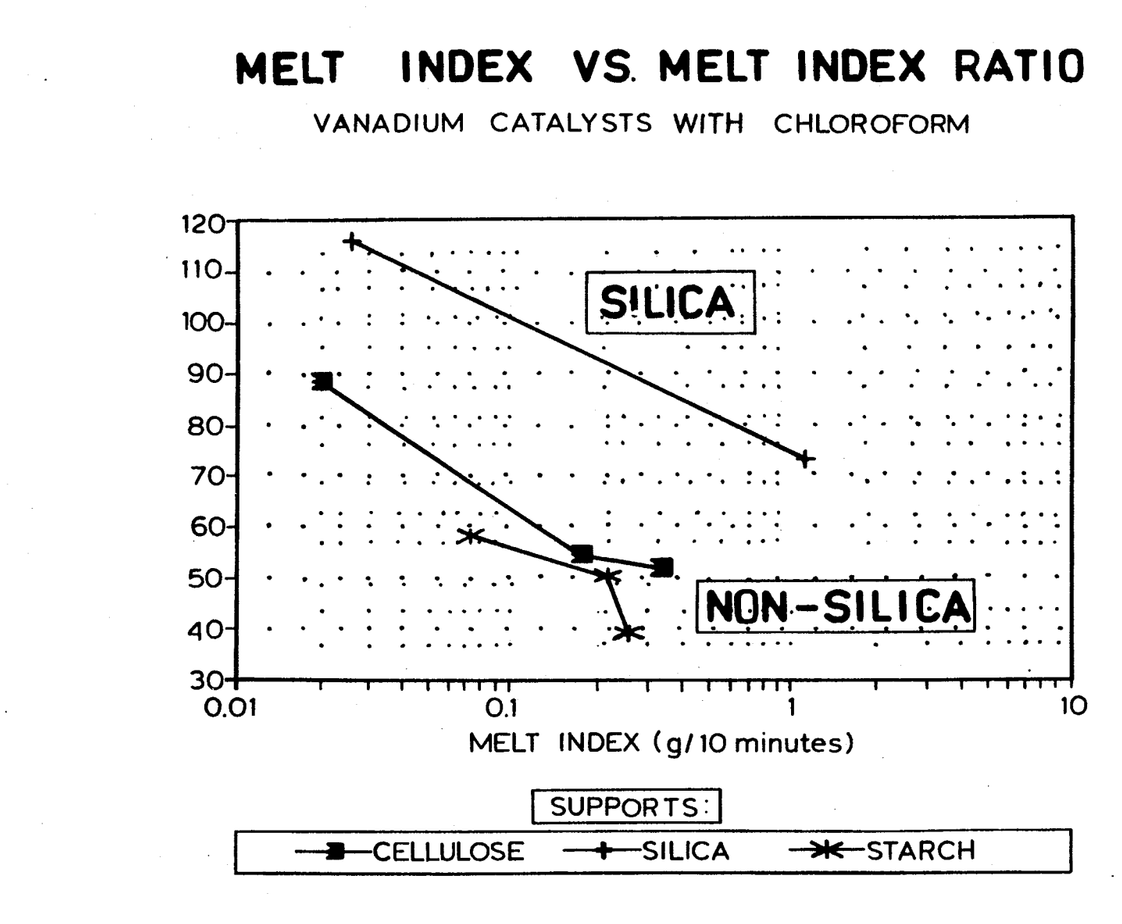
The sole FIGURE is a series of plots of melt index ratio vs. melt index for vanadium polymerization catalysts having different supports.

When the results of the polymerization utilizing chloroform are compared to a polymerization utilizing only a vanadium catalyst on a porous silica substrate, the molecular weight distribution of the resulting polyethylene products differ. This is demonstrated by the HLMI/MI values and by the values of an empirical rheological parameter. For high density polyethylene resins manufactured from vanadium catalysts, it is well known that the melt index ratio (HLMI/MI) varies with the melt index (MI), when the catalyst is activated by a halocarbon promoter such as chloroform. In FIG. 1, values of HLMI/MI are plotted against melt index for polyethylene manufactured from vanadium catalysts. The HLMI/MI values for the silica catalysts are higher, thereby indicating a broader molecular weight distribution. The data illustrated in Table 2, therefore, show that the molecular weight distribution of polyethylene can be changed and controlled by the use of a biodegradable substrate support. The same alteration in molecular weight distribution is shown by rheological studies of the polyethylene made with vanadium catalysts. From an empirical rheological characterization wherein a larger rheological value indicates a broader molecular weight distribution. It is observed that the rheological values of polyethylene products from a vanadium catalyst supported on a biodegradable substrate and either made with or without chloroform promoter are about identical, whereas a polyethylene product made from a vanadium catalyst supported on silica and chloroform was found to have a much higher rheological value. Vanadium oxytrichloride was the vanadium compound used for both the starch and the silica supported catalysts. Therefore, a biodegradable substrate supported catalyst provides a polyolefin product having a narrower molecular weight distribution.

EXAMPLE 12

Preparation of Catalyst E

Catalyst E was preparation using a porous biodegradable substrate, CELLULON, available commercially from Weyerhaeuser Company, Tacoma, Wash. This bacterial cellulose product has a larger surface area than traditional cellulose products. Furthermore, the BET surface areas can be increased if the water is removed from the bacterial cellulose by solvent displacements, followed by drying under nitrogen and in vacuum.

In preparing Catalyst E, up to about 50 g of the CELLULON first is extracted for about 24 hours with 300 mL of methyl alcohol. The resulting alcohol-water mixture then is decanted or removed by filtration, and 300 mL of isopropyl alcohol then is utilized for a second 24 hours extraction. This alcohol-water liquid is removed from the bacterial cellulose and replaced with 300 mL of heptane. Finally, the bacterial cellulose is dried under a nitrogen purge at room temperature, and can be dried further at up to 100° C. in a vacuum. For one sample of CELLULON, the following values of surface area and pore volume were found by BET porosimetry:

| | Stage | Surface Area ($M^2/g$) | Pore Volume (ml/g) |
|---|---|---|---|
| (a) | Brief nitrogen purge after heptane removal | 66.9 | 0.38 |
| (b) | 48 hrs. nitrogen purging beyond (a) | 166.0 | 0.80 |
| (c) | 2 hrs. in a vacuum oven beyond (b) | 205.4 | 1.12 |

Catalyst E was prepared With CELLULON that had been processed by solvent displacements and drying as described above. CELLULON (2.1 g) was placed in a dry round bottom flask. The flask was placed in a 100° C. oil bath and purged with nitrogen for 3 hours. Nitrogen purging was continued for an overnight period at room temperature. Heptane (21 mL) was added to the flask, then 6.3 mL of 0.665 M butylethylmagnesium in heptane was introduced to the flask while the CELLULON was stirred in the heptane. After about 1 hr at room temperature, the CELLULON was allowed to settle, and the supernatant liquid was removed by syringe. Heptane (21 mL) was added to the reaction flask, and, while stirring, 2.1 mL of 1.0 M titanium tetrachloride in heptane was added to the flask. After 30 minutes at room temperature, the liquid above the settled solid again was removed by syringe. The resulting catalyst then was washed with heptane (21 mL). The catalyst was dried by nitrogen flow at room temperature overnight.

EXAMPLE 13

Polymerization of Ethylene Utilizing Catalyst E

Catalyst E was utilized in an ethylene polymerization reaction in isobutane as described in Example 9. Triisobutylaluminum was used as a cocatalyst in a 5/1 molar ratio (Al/Ti). The amount of added hydrogen was 52 millimoles. The temperature was maintained at 100° C. during the one hour polymerization reaction. The reactivity of Catalyst E was 1487 g/g cat-hr and the particles of polyethylene appeared similar to the irregular shape of the CELLULON used as the catalyst support.

A plaque was compression molded from the polyethylene prepared in this example and examined with an optical microscope. Several fields were examined, and no embedded particles of CELLULON in the polyethylene were observed. In contrast, particles resembling microcrystalline cellulose were easily observed in polyethylene made from a catalyst having microcrystalline cellulose support by an identical microscope observation method. The essential absence of CELLULON support particles in the plaque indicates that fragmentation of the CELLULON support occurred during polymerization. Accordingly, this indicates that a molecular level mixture of biodegradable substrate and polyolefin was formed.

EXAMPLE 14

Preparation of Catalyst F

Catalyst F also was made utilizing the porous bacterial cellulose CELLULON. The preparation of Catalyst F is essentially identical to the preparation of Catalyst E in Example 12, but triethylaluminum was used as the organometallic compound to treat the CELLU- LON, and vanadium oxytrichloride was used as the transition metal compound. The triethylaluminum was added to provide 2.0 mmols/g of cellulose and the vanadium oxytrichloride was added to provide 1.25 mmoles/g of cellulose.

EXAMPLE 15

Polymerization of Ethylene Utilizing Catalyst F

Catalyst F was utilized in the polymerization of ethylene in essentially an identical manner as described for Catalyst E in Example 13, except chloroform, in a 3/1 ratio to the vanadium content in catalyst, also was added to the polymerization vessel. The reactivity of the catalyst was found to be 1510 g/g cat-hr. The melt index was 0.14 and the HLMI/MI was 76. The particle shape of the polyethylene manufactured using Catalyst F resembled that of the polyethylene manufactured from Catalyst E in Example 13. By the same microscopic observation method utilized in Example 13, no particles of the CELLULON were observed in the polyethylene.

The inventive catalyst can be used either in a particle form or in a gas phase polymerization process, and is especially effective in the production of a high density polyethylene having a narrow molecular weight distribution and high melt index for injection molding applications. The inventive catalyst also can be used in the production of a high-strength fiber or film having a low melt index. The inventive catalyst also is easily injected into particle form reactors by means of well known automatic feeding valves, and corrosion-resistant materials of construction are not required. Any catalyst residues present in the product polymer can remain in the polymer product.

We claim:

1. A solid catalyst component active in the presence of an alkylaluminum cocatalyst in olefin polymerizations prepared by the steps of:
    a) contacting the interior and exterior surfaces of a particulate biodegradable substrate having surface hydroxyl groups, a surface area of at least 50 square meters per gram and a pore volume of at least 0.50 milliliters per gram, with an organometallic compound selected from the group consisting of Group IIA organometallic compounds, Group III organometallic compounds, Group IIA-Group III organometallic complexes, and combinations thereof, in the presence of a solvent, to form a modified biodegradable substrate; and
    b) contacting the interior and exterior surfaces of the modified biodegradable substrate with a transition metal compound, in the presence of a solvent, whereby catalytically active sites are provided on the interior and exterior surfaces of the biodegradable substrate to form a solid catalyst component susceptible to fragmentation caused by polymer forming on the interior surfaces thereof during polymerization.

2. The catalyst component of claim 1 wherein the biodegradable substrate is a carbohydrate.

3. The catalyst component of claim 2 wherein the carbohydrate is a monosaccharide, a disaccharide, an oligosaccharide, a polysaccharide, or a combination thereof.

4. The catalyst component of claim 2 wherein the carbohydrate is selected from the group consisting of sucrose, glucose, fructose, xylose, ribose, mannose, maltose, lactose, gentiobiose, starch, cellulose, glycogen, dextran, mannan, chitin, pectin, hemicellulose, carrageenan, alginic acid, plant gums, salts thereof, and combinations thereof.

5. The catalyst component of claim 1 wherein the biodegradable substrate is a carbohydrate derivative.

6. The catalyst component of claim 5 wherein the carbohydrate derivative is selected from the group consisting of ethylcellulose, hydroxypropylcellulose, carboxymethylcellulose, methylcellulose, hydroxybutylcellulose, carboxymethylhydroxyethylcellulose, methylhydroxypropylcellulose, ethylhydroxyethylcellulose, methylhydroxyethylcellulose, methylethylcellulose, chitosan, and combinations thereof.

7. The catalyst component of claim 1 wherein the biodegradable substrate is lignin, collagen, or a combination thereof.

8. The catalyst component of claim 1 wherein the biodegradable substrate is selected from the group consisting of cellulose, carboxymethylcellulose, starch, fructose, sucrose, glucose, chitin, chitosan, ethylcellulose, hydroxypropylcellulose, hydroxybutylcellulose, and combinations thereof.

9. The catalyst component of claim 1 wherein the biodegradable substrate has an average particle size of about 5 microns to about 100 microns.

10. The catalyst component of claim 9 wherein the biodegradable substrate is microcrystalline cellulose or bacterial cellulose.

11. The catalyst component of claim 1 wherein the biodegradable substrate is bacterial cellulose.

12. The catalyst component of claim 1 wherein a metal of the organometallic compound is selected from the group consisting of calcium, magnesium, aluminum, and combinations thereof.

13. The catalyst component of claim 1 wherein the Group IIA organometallic compound is selected from the group consisting of alkoxymagnesium halides; dialkoxymagnesium compounds; dialkylmagnesium compounds; alkylmagnesium silylamides, having the formula $R^3—Mg—N(Si(CH_3)_3)_2$, wherein $R^3$ is an alkyl group including one to about 18 carbon atoms; and combinations thereof.

14. The catalyst component of claim 13 wherein the alkoxy group or the alkyl group of the Group IIA organometallic compound includes about three to about twenty carbon atoms.

15. The catalyst component of claim 1 wherein the Group III organometallic compound is selected from the group consisting of trialkylaluminum compounds, dialkylaluminum halides, alkylaluminum dihalides, and combinations thereof.

16. The catalyst component of claim 15 wherein the alkyl group of the Group III organometallic compound includes about two to about four carbon atoms.

17. The catalyst component of claim 1 wherein the organometallic compound is a magnesium-aluminum organometallic complex having the formula $(R_2Mg)_nAlR^1_3$, wherein R is an alkyl or an alkoxy group including about three to about twenty carbon atoms, $R^1$ is an alkyl group including about two to about four carbon atoms and n is a number in the range of 1 to about 8.

18. The catalyst component of claim 1 wherein the organometallic compound is selected from the group consisting of 2-methylpentoxymagnesium chloride, pentoxymagnesium chloride, phenoxymagnesium chloride, di-ethylhexyloxymagnesium, di-2 methylpentoxymagnesium, dibutylmagnesium, dihexyl magnesium, n-butylethylmagnesium, dibutylmagnesium-triethylaluminum complex, triethylaluminum, butylmagnesium silylamide, and combinations thereof.

19. The catalyst component of claim 1 wherein the organometallic compound is present in a weight ratio with respect to transition metal present in the transition metal compound of about 0.1 to about 100.

20. The catalyst component of claim 1 wherein the organometallic compound is a Group IIA organometallic compound and is present in a weight ratio with respect to transition metal present in the transition metal compound of about 0.1 to about 20.

21. The catalyst component of claim 1 wherein the organometallic compound is contacted with the biodegradable substrate at a temperature of about 0° C. to about 100° C. for about 5 minutes to about 120 minutes.

22. The catalyst component of claim 1 wherein the solvent comprises a hydrocarbon solvent including about five carbon atoms to about ten carbon atoms.

23. The catalyst component of claim 1 wherein the transition metal compound is a transition metal halide, a transition metal oxyhalide, a transition metal alkoxyhalide, a transition metal alkoxide, or a combination thereof.

24. The catalyst component of claim 1 wherein a transition metal of the transition metal compound is selected from the group consisting of titanium, vanadium, zirconium, chromium, nickel, cobalt, niobium, tantalum, palladium, rhodium, molybdenum, tungsten, and combinations thereof.

25. The catalyst component of claim 1 wherein the transition metal of the transition metal compound is a Group IVB metal, a Group VB metal, or a combination thereof.

26. The catalyst component of claim 1 wherein the transition metal of the transition metal compound is one or more of titanium, vanadium, and zirconium.

27. The catalyst component of claim 26 wherein the transition metal compound is selected from the group consisting of $TiX_4$, $Ti(OR^3)_xX_{4-x}$, $VOX_3$, $VX_4$, $Zr(OR^3)_xX_{4-x}$, and mixtures thereof, wherein X is chloride or bromide, $R^3$ is cyclopentadienyl; an alkyl, a cycloalkyl or an alkenyl group including from one to about ten carbon atoms; or an aryl or alkaryl group including about five to about 20 carbon atoms, and x is an integer from 0 to 4 inclusive.

28. The catalyst component of claim 1 wherein the transition metal compound is selected from the group consisting of titanium tetrachloride, titanium(IV) methoxide, methoxytitanium trichloride, diethoxytitanium dichloride, titanium tetrabromide, vanadium(V)trichloride oxide, vanadium(IV) chloride, bis(cyclopentadienyl)zirconium dichloride, and zirconium propoxide.

29. The catalyst component of claim 1 wherein the transition metal compound is included in a sufficient amount to provide the transition metal in the range of about 0.05% to about 50%, based on the weight of the modified biodegradable substrate.

30. The catalyst component of claim 1 wherein the transition metal compound is included in a sufficient amount to provide the transition metal in the range of about 0.5% to about 20%, based on the weight of the modified biodegradable substrate.

31. The catalyst component of claim 1 wherein the transition metal compound is contacted with the modified biodegradable substrate at a temperature of from about 20° C. to about 120° C. for about 5 minutes to about 120 minutes.

32. The catalyst component of claim 1 wherein the modified biodegradable substrate is solubilized in a solution of the transition metal compound and the solvent, and after contacting the modified biodegradable substrate with the transition metal compound to form the product mixture, the solvent is separated from the product mixture and the catalyst is formed into a predetermined shape.

33. The catalyst component of claim 1 wherein the biodegradable substrate is microcrystalline cellulose or bacterial cellulose, the organometallic compound is 2-methylpentoxymagnesium chloride, the transition metal compound is titanium tetrachloride and the solvent is heptane.

34. The catalyst component of claim 1 wherein the biodegradable substrate is treated prior to interaction with the organometallic compound to reduce the number of hydroxyl groups present on the biodegradable substrate.

35. The catalyst component of claim 34 wherein the biodegradable substrate is treated by silylation, fluoridation, or a combination thereof.

36. A catalyst system comprising the solid catalyst component of claim 1 in combination with an alkylaluminum cocatalyst comprising a trialkylaluminum compound, an alkylaluminum hydride, an alkylaluminum halide, or a mixture thereof, wherein the alkyl group includes one to about ten carbon atoms.

37. The catalyst system of claim 36 wherein the alkylaluminum cocatalyst is selected from the group consisting of triethylaluminum, trioctylaluminum, tri(2-methylpentyl)aluminum, diethylaluminum hydride, methylaluminoxane, triisobutylaluminum, diisobutylaluminum hydride, diethylaluminum chloride, ethylaluminum dichloride, diethylaluminum ethoxide, and diethylaluminum trimethylsiloxide.

38. The catalyst system of claim 36 wherein the mole ratio of aluminum in the alkylaluminum cocatalyst to the transition metal in the solid catalyst component is about 3:1 to about 100:1.

39. A method of preparing a solid catalyst component, said catalyst component being active in the presence of an alkylaluminum cocatalyst in olefin polymerizations, comprising the steps of:
   a) contacting the interior and exterior surfaces of a particulate biodegradable substrate having surface hydroxyl groups, a surface area of at least 50 square meters per gram and a pore volume of at least 0.50 milliliters per gram, with an organometallic compound selected from the group consisting of Group IIA organometallic compounds, Group III organometallic compounds, Group IIA-Group III organometallic complexes, and combinations thereof, in the presence of a solvent, to form a modified biodegradable substrate; and
   b) contacting the interior and exterior surfaces of the modified biodegradable substrate with a transition metal compound, in the presence of a solvent, whereby catalytically active sites are provided on the interior and exterior surfaces of the biodegradable substrate to form a solid catalyst component susceptible to fragmentation caused by polymer forming on the interior surfaces thereof during polymerization.

* * * * *